(12) United States Patent
Luan et al.

(10) Patent No.: US 11,321,411 B1
(45) Date of Patent: May 3, 2022

(54) SYSTEMS AND METHODS FOR PROVIDING CONTENT

(71) Applicant: Meta Platforms, Inc., Menlo Park, CA (US)

(72) Inventors: Wentao Luan, Seattle, WA (US); Jinyi Yao, Bellevue, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/235,847

(22) Filed: Dec. 28, 2018

(51) Int. Cl.
| | |
|---|---|
| *G06F 16/9537* | (2019.01) |
| *G06T 19/00* | (2011.01) |
| *G06F 16/9535* | (2019.01) |
| *H04W 4/021* | (2018.01) |
| *G06T 19/20* | (2011.01) |

(52) U.S. Cl.
CPC ...... *G06F 16/9537* (2019.01); *G06F 16/9535* (2019.01); *G06T 19/006* (2013.01); *G06T 19/20* (2013.01); *H04W 4/021* (2013.01)

(58) Field of Classification Search
CPC .............. G06T 19/006; G06F 16/9536; G06F 16/9537; H04W 4/021; G06Q 30/02
See application file for complete search history.

(56) References Cited

U.S. PATENT DOCUMENTS

| | | | | |
|---|---|---|---|---|
| 6,037,936 A * | 3/2000 | Ellenby | ................... | G01C 17/34 348/211.8 |
| 6,414,696 B1 * | 7/2002 | Ellenby | ................... | G01C 17/34 348/E5.042 |
| 7,460,953 B2 * | 12/2008 | Herbst | ................... | G01C 21/20 701/438 |
| 7,720,436 B2 * | 5/2010 | Hamynen | ........... | G06F 16/9537 455/13.1 |
| 7,961,986 B1 * | 6/2011 | Jing | ..................... | G06K 9/6224 382/305 |
| 7,996,015 B2 * | 8/2011 | Bloebaum | ......... | H04M 1/72572 455/456.1 |
| 8,397,166 B2 * | 3/2013 | Matsumoto | ......... | G06F 3/04883 715/731 |
| 8,711,176 B2 * | 4/2014 | Douris | ............... | G01C 21/3602 345/633 |
| 8,751,156 B2 * | 6/2014 | Musabji | ............. | G01C 21/3638 701/428 |
| 8,994,851 B2 * | 3/2015 | Varanasi | ................ | G01C 21/20 348/231.3 |
| 9,026,947 B2 * | 5/2015 | Lee | ....................... | G06F 1/1686 715/851 |
| 9,043,318 B2 * | 5/2015 | Kim | ...................... | G06F 16/58 707/724 |

(Continued)

*Primary Examiner* — Ryan R Yang
(74) *Attorney, Agent, or Firm* — Sheppard Mullin Richter & Hampton LLP

(57) ABSTRACT

Systems, methods, and non-transitory computer-readable media can determine at least one real-world scene being captured by one or more cameras of the computing device while being operated by a user, wherein the at least one real-world scene corresponds to a geographic location associated with an entity. At least one real-world surface can be determined based at least in part on the captured real-world scene. Content related to the entity can be obtained from a content provider. The content related to the entity can be presented on the at least one real-world surface through an augmented reality interface.

20 Claims, 7 Drawing Sheets

(56) References Cited

U.S. PATENT DOCUMENTS

| | | | |
|---|---|---|---|
| 9,329,052 B2* | 5/2016 | Varanasi | G01C 21/3647 |
| 9,330,431 B2* | 5/2016 | Huang | G06T 1/20 |
| 9,607,436 B2* | 3/2017 | Malamud | G06T 19/006 |
| 10,133,931 B2* | 11/2018 | Brooks | G06K 9/00671 |
| 10,387,487 B1* | 8/2019 | Svendsen | G06F 16/535 |
| 2006/0026170 A1* | 2/2006 | Kreitler | G06F 16/9537 |
| 2007/0091123 A1* | 4/2007 | Akashi | G09G 5/14 |
| | | | 345/629 |
| 2009/0289956 A1* | 11/2009 | Douris | G06F 16/9537 |
| | | | 345/633 |
| 2009/0318168 A1* | 12/2009 | Khosravy | G06Q 30/0241 |
| | | | 455/456.3 |
| 2010/0048242 A1* | 2/2010 | Rhoads | G06F 16/50 |
| | | | 455/556.1 |
| 2010/0083117 A1* | 4/2010 | Matsumoto | G06F 3/04883 |
| | | | 715/731 |
| 2010/0328344 A1* | 12/2010 | Mattila | G06F 1/1626 |
| | | | 345/633 |
| 2011/0143811 A1* | 6/2011 | Rodriguez | H04N 1/00127 |
| | | | 455/556.1 |
| 2011/0164163 A1* | 7/2011 | Bilbrey | G06F 1/1694 |
| | | | 348/333.01 |
| 2011/0254861 A1* | 10/2011 | Emura | G06F 3/0488 |
| | | | 345/633 |
| 2011/0319131 A1* | 12/2011 | An | H04N 1/00307 |
| | | | 455/556.1 |
| 2012/0001939 A1* | 1/2012 | Sandberg | G01C 21/3682 |
| | | | 345/633 |
| 2012/0033070 A1* | 2/2012 | Yamazaki | G06K 9/00624 |
| | | | 348/135 |
| 2012/0221687 A1* | 8/2012 | Hunter | G06F 16/435 |
| | | | 709/219 |
| 2013/0027429 A1* | 1/2013 | Hogg | H04W 4/021 |
| | | | 345/633 |
| 2013/0035114 A1* | 2/2013 | Holden | H04W 4/08 |
| | | | 455/456.3 |
| 2013/0162665 A1* | 6/2013 | Lynch | G01C 21/3647 |
| | | | 345/589 |
| 2013/0278631 A1* | 10/2013 | Border | G06F 3/04842 |
| | | | 345/633 |
| 2014/0006966 A1* | 1/2014 | Geraci | G06Q 30/0259 |
| | | | 715/748 |
| 2014/0100996 A1* | 4/2014 | Klein | G06Q 30/0643 |
| | | | 705/27.2 |
| 2014/0100997 A1* | 4/2014 | Mayerle | G06Q 30/0643 |
| | | | 705/27.2 |
| 2014/0168262 A1* | 6/2014 | Forutanpour | G06T 19/006 |
| | | | 345/633 |
| 2014/0244160 A1* | 8/2014 | Cragun | G01C 21/20 |
| | | | 701/436 |
| 2017/0053331 A1* | 2/2017 | Kim | G06Q 30/02 |
| 2017/0243352 A1* | 8/2017 | Kutliroff | G06T 7/10 |
| 2018/0336728 A1* | 11/2018 | Edwards | G06T 19/006 |
| 2019/0095443 A1* | 3/2019 | Chan | G06Q 30/06 |
| 2019/0122164 A1* | 4/2019 | Berrebbi | G06Q 30/0631 |

\* cited by examiner

500

```
┌─────────────────────────────────────────────────────────────┐
│ Determine at least one real-world scene being captured by   │
│ one or more cameras of a computing device, wherein the at   │
│ least one real-world scene corresponds to a geographic      │
│ location associated with an entity                          │
│ 502                                                         │
└─────────────────────────────────────────────────────────────┘
                              │
                              ▼
┌─────────────────────────────────────────────────────────────┐
│ Determine at least one real-world surface based at least in │
│ part on the captured real-world scene                       │
│ 504                                                         │
└─────────────────────────────────────────────────────────────┘
                              │
                              ▼
┌─────────────────────────────────────────────────────────────┐
│ Obtain content related to the entity from a content provider│
│ 506                                                         │
└─────────────────────────────────────────────────────────────┘
                              │
                              ▼
┌─────────────────────────────────────────────────────────────┐
│ Present the content related to the entity on the at least   │
│ one real-world surface through an augmented reality         │
│ interface                                                   │
│ 508                                                         │
└─────────────────────────────────────────────────────────────┘
```

FIGURE 5

SYSTEMS AND METHODS FOR PROVIDING CONTENT

FIELD OF THE INVENTION

The present technology relates to the field of networked communications. More particularly, the present technology relates to techniques for presenting content to users in a computerized networking system.

BACKGROUND

Today, people often utilize computing devices (or systems) for a wide variety of purposes. For example, users can use their computing devices to interact with other users, create content, share content, and view content. In some cases, users can utilize their computing devices to access a social network and post content to the social network. Content posted to the social network may include text content items and media content items, such as audio, images, and videos. The posted content may be published to the social network for consumption by others.

SUMMARY

Various embodiments of the present technology can include systems, methods, and non-transitory computer readable media configured to determine at least one real-world scene being captured by one or more cameras of the computing device while being operated by a user, wherein the at least one real-world scene corresponds to a geographic location associated with an entity. At least one real-world surface can be determined based at least in part on the captured real-world scene. Content related to the entity can be obtained from a content provider. The content related to the entity can be presented on the at least one real-world surface through an augmented reality interface.

In an embodiment, the content related to the entity is superimposed on the at least one real-world surface within the augmented reality interface.

In an embodiment, the content related to the entity is ranked for a user of the computing device based at least in part on user features associated with the user.

In an embodiment, wherein the entity is determined based at least in part on a geographic location of the computing device matching the geographic location associated with the entity.

In an embodiment, the entity is determined based at least in part on information scanned using one or more cameras of the computing device matching information previously associated with the entity.

In an embodiment, wherein determining the at least one real-world surface includes determining a scene reconstruction of the at least one real-world scene and determining the at least one real-world surface from the scene reconstruction of the real-world scene.

In an embodiment, the scene reconstruction is determined based on one or more point cloud representations of the at least one real-world scene.

In an embodiment, the at least one real-world surface is determined from the one or more point cloud representations based on application of a random sample consensus (RANSAC) algorithm.

In an embodiment, the at least one real-world surface is determined based at least in part on information describing a direction of gravity as provided by the computing device.

In an embodiment, wherein determining the at least one real-world surface includes determining a surface at the geographic location associated with the entity having (i) a particular orientation and (ii) a threshold size needed to superimpose the content related to the entity.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method, according to an embodiment of the present technology.

Figure 1:
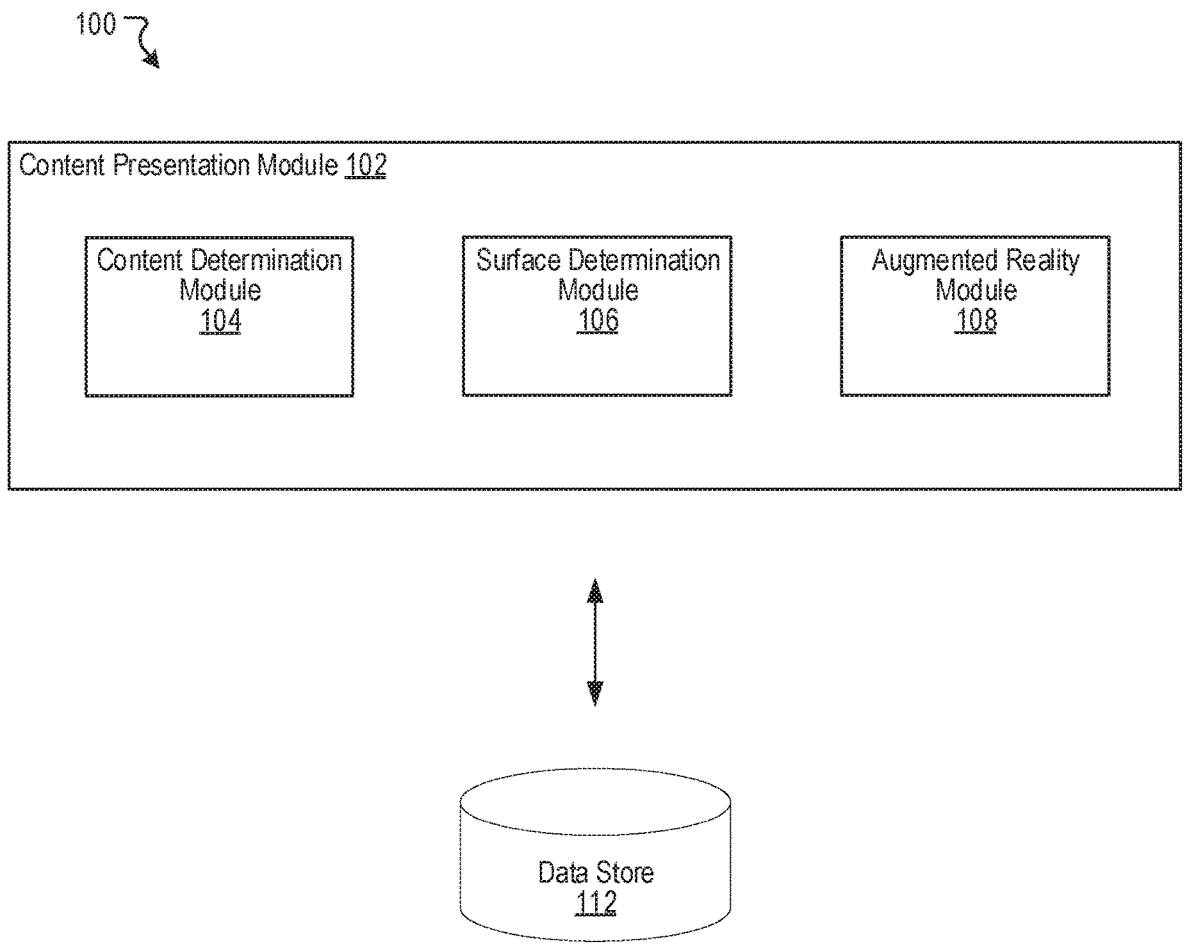
FIG. 1 illustrates an example system including an example content presentation module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Content

Under conventional approaches, users can access various content through a content provider (e.g., a social networking system). Typically, a user operating a computing device can interact with the content provider over one or more computer networks. Further, the accessed content can be presented through a display screen by a software application (e.g., a web browser, social networking application, etc.) running on the computing device. Such conventional approaches permit users to conveniently access various types of content. For example, an entity (e.g., page administrator, owner, etc.) may create and publish a page for a business through the content provider. Users can access the page to view various information related to the business such as hours of operation, services offered, and reviews of the business, to name some examples. However, these conventional approaches are generally not effective for increasing user engagement with the page. For example, conventional approaches typically do not encourage or incentivize users to access entity-specific content through the content provider while visiting geographic locations associated with entities (e.g., restaurants, points of interest, etc.). Further, conventional approaches also generally do not encourage or incentivize users to visit geographic locations associated with entities. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a user can be provided content related to an entity when the user visits a geographic location associated with the entity (e.g., a restaurant, point of interest, etc.). In some embodiments, the user can be required to perform some action to view the content. For example, in various embodiments, the user can be required to position a computing device to capture a real-world surface (e.g., a wall surface, a table surface, etc.) to view content relating to the entity. For example, once the user positions a display screen of the computing device to be aligned with the real-world surface, a software application (e.g., social networking application) running on the computing device can superimpose content related to the entity on the real-world surface within an augmented reality interface. This improved approach offers advantages over conventional approaches especially with respect to user engagement with a page. For example, the improved approach helps encourage users to access entity-specific content while visiting geographic locations associated with the entity using the augmented reality interface. For example, users may be able to access specials or deals offered by the entity in addition to user reviews and ratings of the entity. The improved approach also allows entities to encourage user visits to their geographic locations by providing access to exclusive geolocated content (e.g., a secret food menu) and presenting that exclusive content through the augmented reality interface. More details relating to the present technology are provided below.

FIG. 1 illustrates an example system 100 including an example content presentation module 102, according to an embodiment of the present technology. As shown in the example of FIG. 1, the content presentation module 102 can include a content determination module 104, a surface determination module 106, and an augmented reality module 108. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the content presentation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content presentation module 102 or at least a portion thereof can be implemented using one or more computing devices or systems that include one or more servers, such as network servers or cloud servers. In some instances, the content presentation module 102 can, in part or in whole, be implemented within or configured to operate in conjunction with a social networking system (or service), such as the social networking system 630 of FIG. 6. In some instances, the content presentation module 102 can be, in part or in whole, implemented within or configured to operate in conjunction or be integrated with a client computing device, such as the user device 610 of FIG. 6. For example, the content presentation module 102 can be implemented as or within a dedicated application (e.g., app), a program, or an applet running on a user computing device or client computing system. The application incorporating or implementing instructions for performing some, or all, functionality of the content presentation module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content presentation module 102 can be configured to communicate and/or operate with the at least one data store 112, as shown in the example system 100. The at least one data store 112 can be configured to store and maintain various types of data. For example, the data store 112 can store information describing various content that has been shared by users of a social networking system. In some embodiments, the data store 112 can store information describing users, entities, and various content associated with entities. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The content determination module 104 can be configured to determine content to be presented to users. For example, in some embodiments, the content determination module 104 can determine when a user is visiting a geographic location associated with an entity (e.g., a restaurant, point of interest, etc.). In such embodiments, the content determination module 104 can obtain content related to the entity for potential presentation to the user through an augmented reality interface. More details regarding the content determination module 104 will be provided below with reference to FIG. 2.

The surface determination module 106 can be configured to detect surfaces on which content can be presented (or superimposed) within an augmented reality interface. For example, the augmented reality interface can be accessed through a display screen of a computing device. The surface determination module 106 can determine when a real-world surface being reproduced through the augmented reality interface satisfies a threshold size (e.g., threshold dimensions, surface area, etc.). If the threshold size is satisfied, the surface determination module 106 can instruct the augmented reality module 108 to present the content in relation to the real-world surface within the augmented reality interface. More details regarding the surface determination module 106 will be provided below with reference to FIG. 3.

The augmented reality module 108 can apply generally known augmented reality techniques to present content on surfaces through an augmented reality interface. For example, the augmented reality module 108 can superimpose content generated by the content determination module 104 on a real-world surface detected by the surface determination module 106, thereby providing a composite view of both the real-world surface and the superimposed content. In various embodiments, the content to be presented may be formatted using various fonts, styles, and colors. Many variations are possible.

Figure 2:
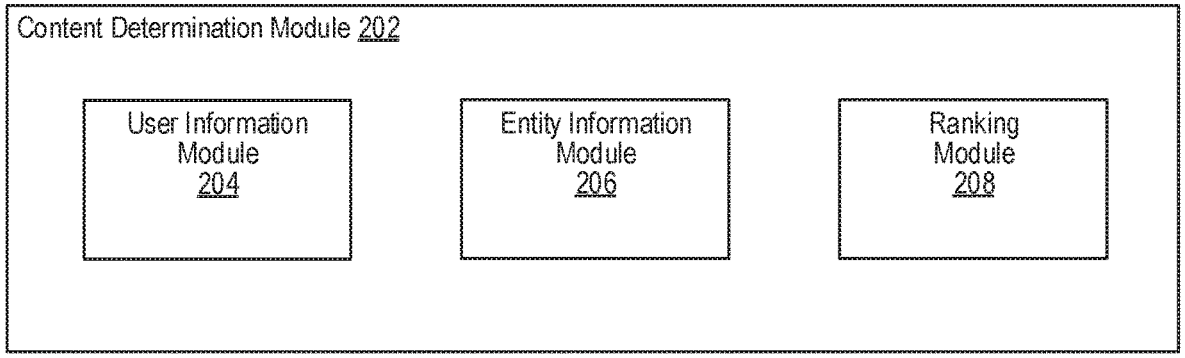
FIG. 2 illustrates an example content determination module, according to an embodiment of the present technology.

FIG. 2 illustrates a content determination module 202, according to an embodiment of the present technology. The content determination module 202 can determine content to be shown to users of a content provider (e.g., the social networking system 630 of FIG. 6). In some embodiments, the content determination module 104 of FIG. 1 can be implemented with the content determination module 202. As shown in the example of FIG. 2, the content determination module 202 can include a user information module 204, an entity information module 206, and a ranking module 208.

The user information module 204 can determine features (or attributes) associated with users of the content provider. For example, the user information module 204 can determine a corresponding user id (or identifier) of a user operating a computing device. For example, the computing device may be running a software application (e.g., a social networking application) from which such information may be obtained. Similarly, the user information module 204 can determine topics of interest to the user, social connections of the user, check-in activity of the user, and demographic data, to name some examples. In various embodiments, such features can be provided to the ranking module 208 for purposes of ranking entity-related content for the user, as described below.

The entity information module 206 can determine entities with which users are interacting. The entity information module 206 can also obtain corresponding entity-related content that can potentially be presented to the users. In some embodiments, the entity information module 206 can determine an entity based on a geographic location of a user. For example, the entity information module 206 can determine the geographic location of the user based on geographic positioning system (GPS) information provided by a computing device being operated by the user. In such embodiments, the entity information module 206 can identify the entity with which the user is interacting based on the geographic location of the user matching a geographic location associated with the entity. In other embodiments, the entity information module 206 can determine an entity with which a user is interacting based on scanned information provided by a computing device of the user. For example, while operating the computing device, the user may scan information (e.g., a quick response (QR) code) associated with the entity using a software application (e.g., social networking application) running on the computing device. The scanned information can be used by the entity information module 206 to identify the entity. The entity information module 206 can also determine content related to that entity. In various embodiments, such content can include reviews and ratings of the entity by other users of the content provider, friend recommendations, top ranked items, service and product menus, and other exclusive content provided by the entity for display through an augmented reality interface (e.g., in-store specials, deals, discounts, off-menu service and product offerings, etc.), to name some examples. In some embodiments, the entity information module 206 can fetch such entity-related content from one or more backend systems associated with the content provider. For example, the entity information module 206 can provide an entity id (or identifier) associated with the entity to the backend systems. The backend systems can then provide various entity-related content associated with the entity that is stored and managed by the content provider. In various embodiments, such entity-related content can be ranked for the user based on the features that were determined for the user, as described below.

The ranking module 208 can rank the entity-related content based on user features. The ranking module 208 can then provide the best ranking entity-related content for presentation to the user, for example, through an augmented reality interface. In various embodiments, the ranking module 208 can rank entity-related content for the user based on generally known machine learning techniques. For example, in some embodiments, the ranking module 208 can rank entity-related content for the user based on collaborative filtering. In such embodiments, the ranking module 208 can select entity-related content that is most likely to be of interest to the user based on entity-related content accessed by other users that share features with the user. As a result, users can be provided entity-specific content that is relevant to the users. Many variations are possible.

Figure 3:
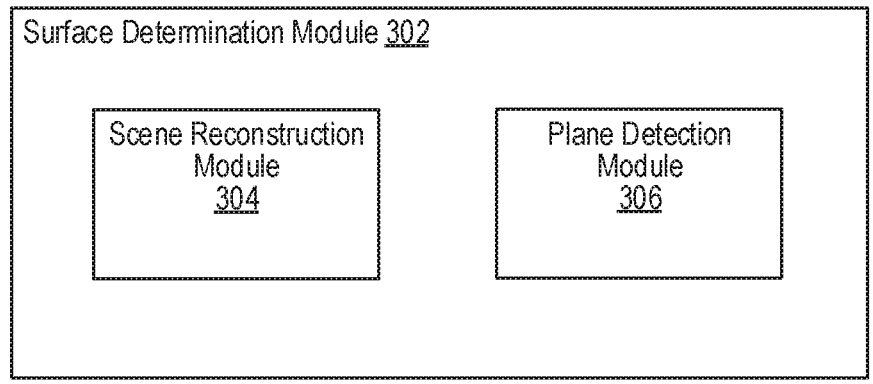
FIG. 3 illustrates an example surface determination module, according to an embodiment of the present technology.

FIG. 3 illustrates a surface determination module 302, according to an embodiment of the present technology. The surface determination module 302 can determine real-world surfaces on which content can be superimposed (or projected) within an augmented reality interface. In some embodiments, the surface determination module 106 of FIG. 1 can be implemented with the surface determination module 302. As shown in the example of FIG. 3, the surface determination module 302 can include a scene reconstruction module 304 and a plane detection module 306.

The scene reconstruction module 304 can reconstruct real-world scenes captured using one or more cameras of a computing device. For example, a user operating the computing device can launch a software application (e.g., social networking application) that provides an augmented reality interface. The augmented reality interface may be accessed through a display screen of the computing device. Further, the augmented reality interface can be used to view real-world scenes being captured by the one or more cameras in real-time (or near real-time). In various embodiments, the scene reconstruction module 304 can reconstruct captured real-world scenes by generating point cloud representations of the real-world scenes. The point cloud representations can be generated using generally known techniques. For example, the scene reconstruction module 304 can apply various 3D reconstruction algorithms and algorithms for determining structure from motion, as provided by the Point Cloud Library (PCL).

The plane detection module 306 can determine surfaces (or planes) in a real-world scene on which entity-related content can be shown within an augmented reality interface. For example, in various embodiments, the plane detection module 306 can determine a surface based on point cloud representations of a real-world scene as determined by the scene reconstruction module 304. In various embodiments, the surface can be determined using generally known techniques for detecting planes in point cloud data. For example, the plane detection module 306 can determine the surfaces based on a random sample consensus (RANSAC) of the point cloud data, as provided by the Point Cloud Library (PCL). In some embodiments, the plane detection module 306 can filter surfaces identified in the real-world scene to determine the best surfaces for superimposing entity-related content within the augmented reality interface. For example, in some embodiments, the plane detection module 306 can filter surfaces based on their respective sizes. For example, surfaces having less than a threshold size (e.g., threshold dimensions, surface area, etc.) can be removed from consideration. In some embodiments, the plane detection module 306 can filter surfaces based on sensor information provided by one or more sensors in a computing device being operated by a user. For example, in some embodiments, the plane detection module 306 can remove horizontal surfaces (e.g., table tops, ceilings, and floors) represented in point cloud data based on a direction of gravity as indicated by the sensor information. In some embodiments, the plane detection module 306 can determine surfaces in a real-world scene based on an orientation and/or threshold size needed to superimpose content. For example, when displaying reviews of a restaurant, the plane detection module 306 can determine a surface located at the restaurant (e.g., a wall) that has a vertical orientation and a threshold size so that reviews of the restaurant can be superimposed on the surface.

Figure 4:
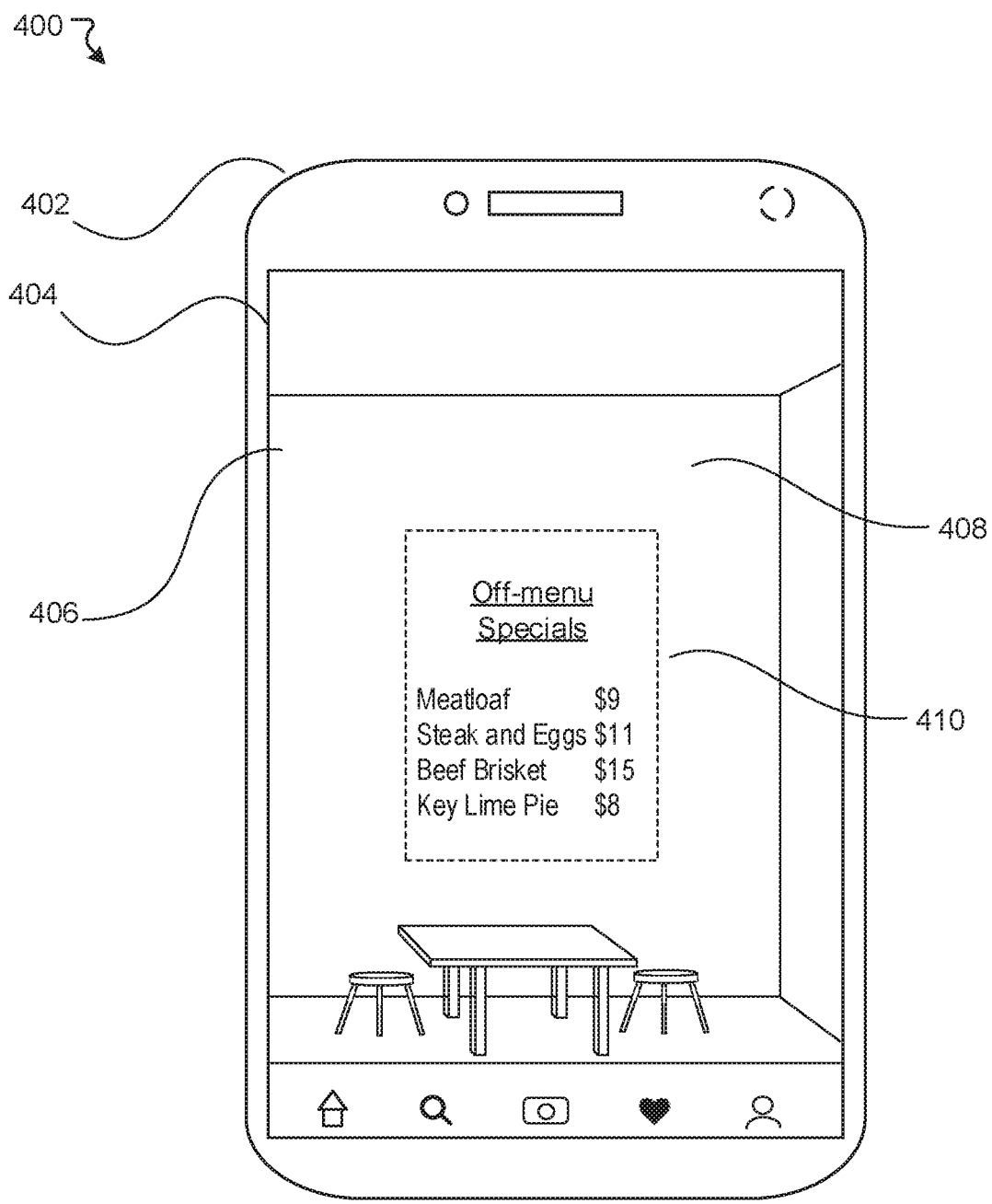
FIG. 4 illustrates an example diagram, according to an embodiment of the present technology.

FIG. 4 illustrates an example diagram 400 of an augmented reality interface 406 supported or implemented by the content presentation module 102. The augmented reality interface 406 may be provided through a display screen 404 of a computing device 402 by a software application (e.g., social networking application) running on the computing device 402 of a user. In some embodiments, the software application can provide an option for activating the augmented reality interface 406. In such embodiments, the augmented reality interface 406 can be presented, for example, when a user operating the computing device 402 selects the option. In the example of FIG. 4, the augmented reality interface 406 is presenting a real-world scene of a geographic location associated with an entity (e.g., a restaurant) being captured by one or more cameras of the computing device 402. The real-world scene includes a wall (or surface) 408 of the restaurant on which content related to the entity can be shown. Based on topics of interest to the user, social connections of the user, check-in activity of the user, and demographic data, to name some examples, content associated with the entity can be retrieved and ranked. The entity can be identified by, for example, a match or overlap between the geographic location of the entity and the geographic location of the user. Highest ranked content associated with the entity can be identified for potential presentation to the user in the augmented reality interface 406. Further, real-world surfaces associated with a premises of the entity on which content can be superimposed (or projected) within the augmented reality interface 406 can be determined. In this example, a food menu 410 associated with the restaurant has been identified for presentation to the user. Accordingly, the augmented reality interface 406 is generated so that the food menu 410 is depicted therein as being superimposed on a wall 408 of the restaurant. Many variations are possible.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, at least one real-world scene being captured by one or more cameras of the computing device while being operated by a user can be determined. The at least one real-world scene corresponds to a geographic location associated with an entity. At block 504, at least one real-world surface can be determined based at least in part on the captured real-world scene. At block 506, content related to the entity can be obtained from a content provider. At block 508, the content related to the entity can be presented on the at least one real-world surface through an augmented reality interface.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
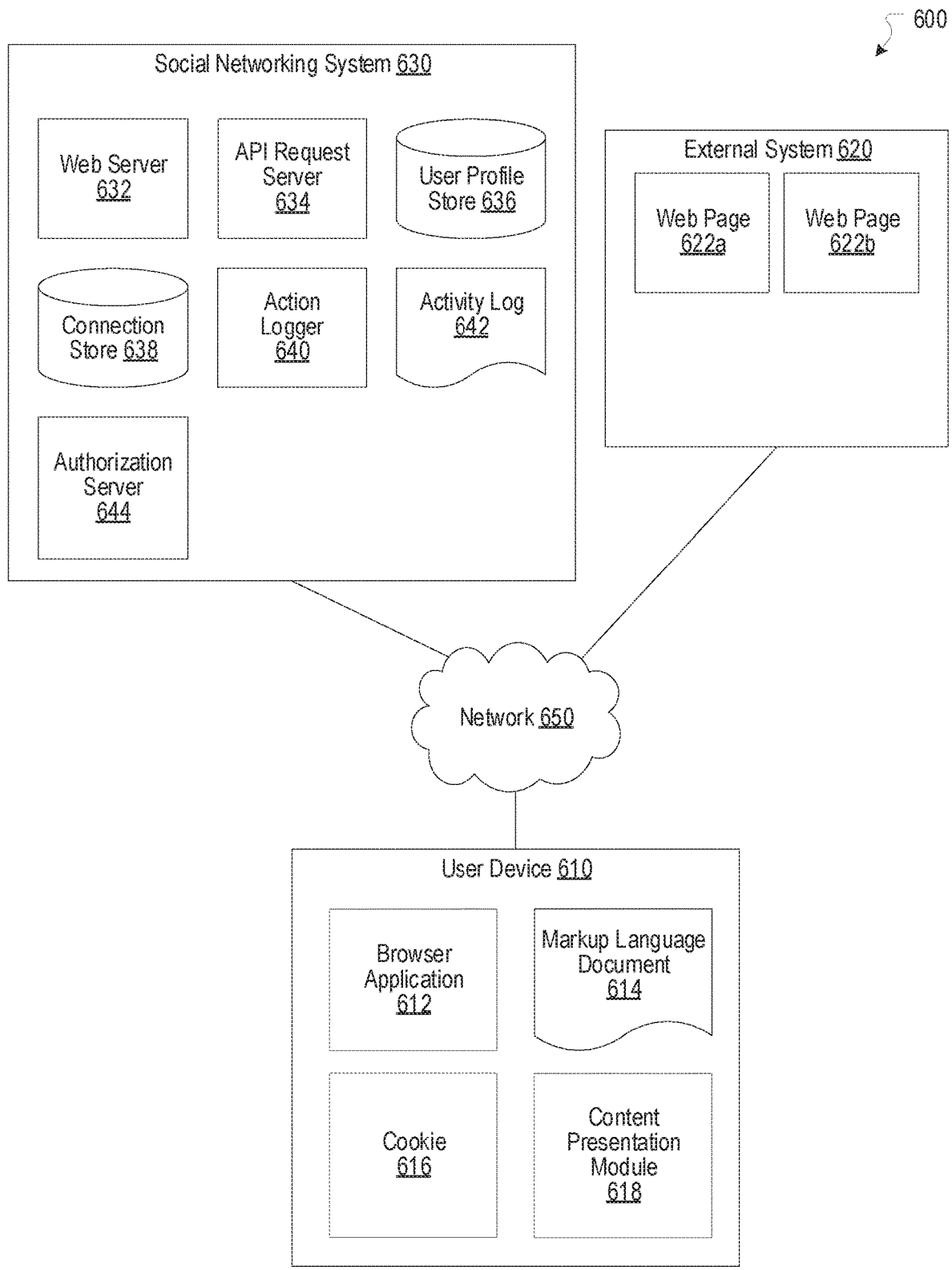
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610. The user device 610 can include a content presentation module 618. In some embodiments, the content presentation module 618 can be implemented as the content presentation module 102 of FIG. 1.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content presentation module. The content presentation module, for example, can be implemented as some or all of the functionality of the content presentation module 102 of FIG. 1. As discussed previously, it should be appreciated that there can be many variations or other possibilities.

Hardware Implementation

Figure 7:
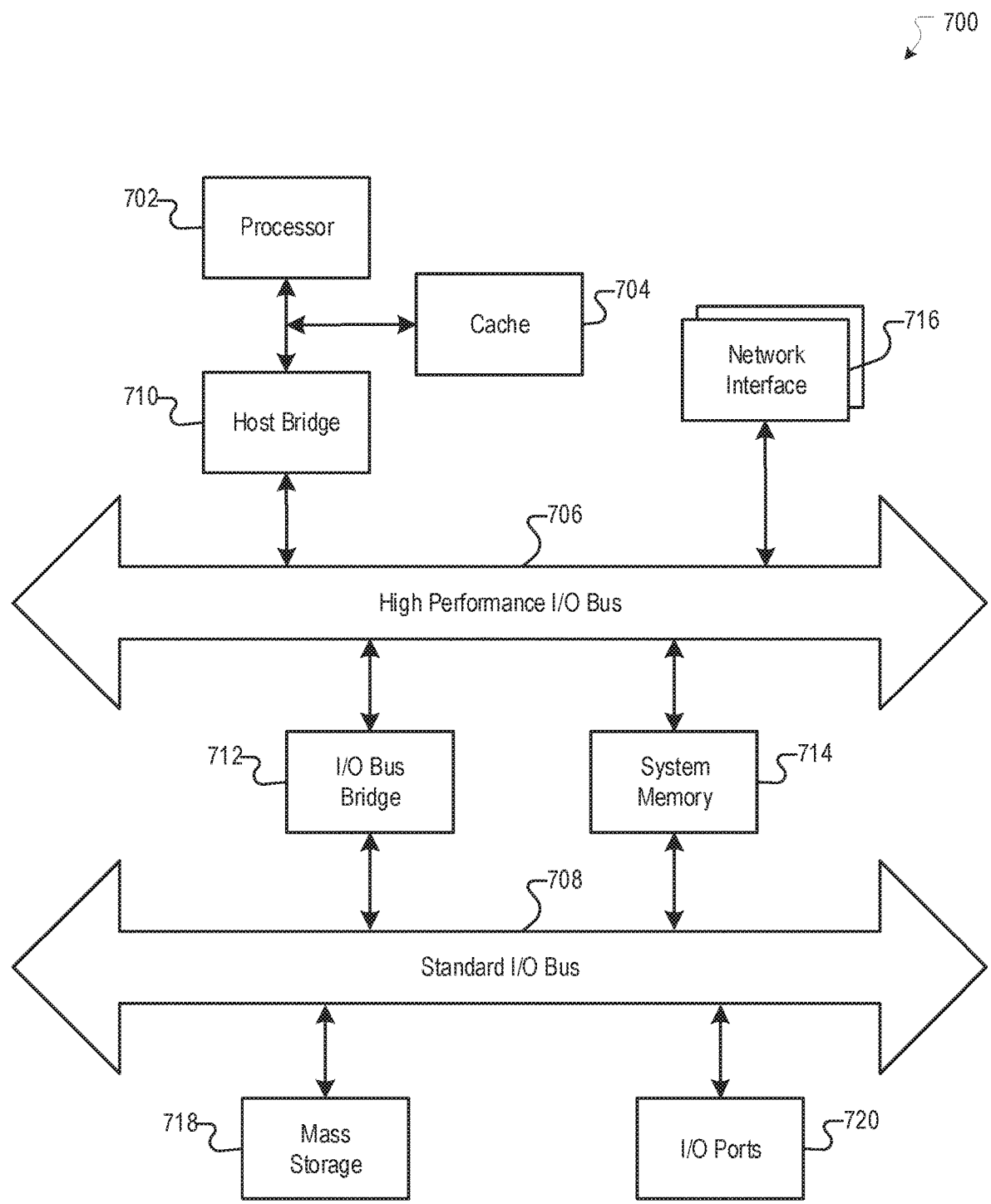
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
determining, by a computing device, at least one real-world scene captured by one or more cameras, wherein the at least one real-world scene corresponds to a geographic location associated with an entity;
obtaining, by the computing device, content related to the entity, the obtaining further comprising:
obtaining, by the computing device, a best ranked content item included in a plurality of content items associated with the entity for a user of an augmented reality interface, wherein the best ranked content item is determined based on user features associated with the user;
determining, by the computing device, a real-world surface based at least in part on the at least one real-world scene and the best ranked content item, the determining the real-world surface further comprising:
determining, by the computing device, an orientation and a size associated with the best ranked content item;
filtering, by the computing device, a plurality of real-world surfaces identified in the at least one real-world scene based on the orientation and the size associated with the best ranked content item to determine the real-world surface, wherein the filtering comprises:
removing, by the computing device, one or more real-world surfaces that correspond to horizontal surfaces from the plurality of filtered real-world surfaces, wherein the one or more real-world surfaces are identified based at least in part on sensor information; and providing, by the computing device, the best ranked content item associated with the entity for potential presentation on the real-world surface in the augmented reality interface.

2. The computer-implemented method of claim 1, wherein the best ranked content item associated with the entity is superimposed on the real-world surface within the augmented reality interface.

3. The computer-implemented method of claim 1, wherein the user features further include one or more topics of interest to the user, social connections of the user, or demographic data of the user.

4. The computer-implemented method of claim 1, wherein the entity is determined based at least in part on a geographic location associated with the computing device matching the geographic location associated with the entity.

5. The computer-implemented method of claim 1, wherein the entity is determined based at least in part on information scanned using the one or more cameras matching information previously associated with the entity.

6. The computer-implemented method of claim 1, wherein determining the real-world surface further comprises:
determining, by the computing device, a scene reconstruction of the at least one real-world scene; and
determining, by the computing device, the real-world surface from the scene reconstruction of the real-world scene.

7. The computer-implemented method of claim 6, wherein the scene reconstruction is determined based on one or more point cloud representations of the real-world scene.

8. The computer-implemented method of claim 7, wherein the real-world surface is determined from the one or more point cloud representations based on application of a random sample consensus (RANSAC) algorithm.

9. The computer-implemented method of claim 7, wherein the real-world surface is determined based at least in part on information describing a direction of gravity.

10. The computer-implemented method of claim 1, wherein determining the real-world surface further comprises:
determining, by the computing device, the real-world surface based on threshold dimensions associated with the best ranked content item, or
determining, by the computing device, the real-world surface based on a surface area associated with the best ranked content item.

11. A system comprising:
at least one processor; and
a memory storing instructions that, when executed by the at least one processor, cause the system to perform:
determining real-world scene captured by one or more cameras, wherein the at least one real-world scene corresponds to a geographic location associated with an entity;
obtaining content related to the entity, the obtaining further comprising:
obtaining a best ranked content item included in a plurality of content items associated with the entity for a user of an augmented reality interface, wherein the best ranked content item is determined based on user features associated with the user;
determining a real-world surface based at least in part on the at least one real-world scene and the best ranked content item, the determining the real-world surface further comprising:
determining an orientation and a size associated with the best ranked content item;
filtering a plurality of real-world surfaces identified in the at least one real-world scene based on the orientation and the size associated with the best ranked content item to determine the real-world surface, wherein the filtering comprises:
removing one or more real-world surfaces that correspond to horizontal surfaces from the plurality of filtered real-world surfaces, wherein the one or more real-world surfaces are identified based at least in part on sensor information; and
providing the best ranked content item associated with the entity for potential presentation on the real-world surface in the augmented reality interface.

12. The system of claim 11, wherein the best ranked content item associated with the entity is superimposed on the real-world surface within the augmented reality interface.

13. The system of claim 11, wherein the user features further include one or more topics of interest to the user, social connections of the user, or demographic data of the user.

14. The system of claim 11, wherein the entity is determined based at least in part on a geographic location associated with the computing device matching the geographic location associated with the entity.

15. The system of claim 11, wherein the entity is determined based at least in part on information scanned using the one or more cameras matching information previously associated with the entity.

16. A non-transitory computer-readable storage medium including instructions that, when executed by at least one processor of a computing system, cause the computing system to perform a method comprising:
determining at least one real-world scene captured by one or more cameras, wherein the at least one real-world scene corresponds to a geographic location associated with an entity;
obtaining content related to the entity, the obtaining further comprising:
obtaining a best ranked content item included in a plurality of content items associated with the entity for a user of an augmented reality interface, wherein the best ranked content item is determined based on user features associated with the user;
determining a real-world surface based at least in part on the at least one real-world scene and the best ranked content item, the determining the real-world surface further comprising:
determining an orientation and a size associated with the best ranked content item;
filtering a plurality of real-world surfaces identified in the at least one real-world scene based on the orientation and the size associated with the best ranked content item to determine the real-world surface, wherein the filtering comprises:
removing one or more real-world surfaces that correspond to horizontal surfaces from the plurality of filtered real-world surfaces, wherein the one or more real-world surfaces are identified based at least in part on sensor information; and
providing the best ranked content item associated with the entity for potential presentation on the real-world surface in the augmented reality interface.

17. The non-transitory computer-readable storage medium of claim 16, wherein the best ranked content item associated with the entity is superimposed on the real-world surface within the augmented reality interface.

18. The non-transitory computer-readable storage medium of claim 16, wherein the user features further include one or more topics of interest to the user, social connections of the user, or demographic data of the user.

19. The non-transitory computer-readable storage medium of claim 16, wherein the entity is determined based at least in part on a geographic location associated with the computing device matching the geographic location associated with the entity.

20. The non-transitory computer-readable storage medium of claim 16, wherein the entity is determined based at least in part on information scanned using the one or more cameras matching information previously associated with the entity.

* * * * *